US010190706B2

(12) United States Patent
Mentink

(10) Patent No.: US 10,190,706 B2
(45) Date of Patent: Jan. 29, 2019

(54) FLAME RESISTANT HOSE ASSEMBLY AND METHOD THEREFORE

(71) Applicant: Kongsberg Actuation Systems II, Inc., Suffield, CT (US)

(72) Inventor: Laurentius Andreas Gerardus Mentink, Haaksbergen (NL)

(73) Assignee: Kongsberg Actuation System II, Inc., Suffield, CT (US)

( * ) Notice: Subject to any disclaimer, the term of this patent is extended or adjusted under 35 U.S.C. 154(b) by 0 days.

(21) Appl. No.: 15/560,104

(22) PCT Filed: Mar. 18, 2016

(86) PCT No.: PCT/US2016/023122
§ 371 (c)(1),
(2) Date: Sep. 20, 2017

(87) PCT Pub. No.: WO2016/153993
PCT Pub. Date: Sep. 29, 2016

(65) Prior Publication Data
US 2018/0087695 A1 Mar. 29, 2018

Related U.S. Application Data

(60) Provisional application No. 62/161,958, filed on May 15, 2015, provisional application No. 62/136,043, filed on Mar. 20, 2015.

(51) Int. Cl.
*F16L 11/12* (2006.01)
*B32B 25/08* (2006.01)
(Continued)

(52) U.S. Cl.
CPC .......... *F16L 11/125* (2013.01); *B29C 47/065* (2013.01); *B32B 1/08* (2013.01);
(Continued)

(58) Field of Classification Search
CPC ....... F16L 11/125; F16L 11/10; B29C 47/065; B32B 1/08; B32B 5/10; B32B 7/02;
(Continued)

(56) References Cited

U.S. PATENT DOCUMENTS 4,137,949 A * 2/1979 Linko, III ............... F16L 9/147
138/125
4,216,803 A * 8/1980 Hall ........................ F16L 9/147
138/143
(Continued)

FOREIGN PATENT DOCUMENTS

| CA | 2159165 C | 5/2003 |
| CN | 203215117 U | 9/2013 |

(Continued)

OTHER PUBLICATIONS

International Search Report for Application No. PCT/US2016/023122 dated Jun. 13, 2016, 4 pages.
(Continued)

*Primary Examiner* — Craig Schneider
*Assistant Examiner* — David Deal
(74) *Attorney, Agent, or Firm* — Howard & Howard Attorneys PLLC

(57) ABSTRACT

A flame resistant hose assembly is disclosed. The hose assembly comprises a tubular inner layer and a flame resistant layer. The tubular inner layer has an interior radial surface and an exterior radial surface and defines a longitudinal axis. The flame resistant layer is disposed about and covers the exterior radial surface of the tubular inner layer. The flame resistant layer is formed from a flame resistant material comprising a polymeric binder and expandable graphite in an amount of from about 5 to about 40 parts by weight based on 100 parts by weight of the flame resistant material. The flame resistant layer expands when heated to
(Continued)

a temperature of about 220° C. or greater and maintains a post-expansion coverage of the exterior radial surface of the tubular inner layer of greater than about 95%.

20 Claims, 5 Drawing Sheets

(51) Int. Cl.

| | | |
|---|---|---|
| *B32B 25/16* | (2006.01) | |
| *B32B 27/08* | (2006.01) | |
| *B32B 27/18* | (2006.01) | |
| *B32B 27/30* | (2006.01) | |
| *B32B 27/32* | (2006.01) | |
| *B32B 27/34* | (2006.01) | |
| *B32B 1/08* | (2006.01) | |
| *B29C 47/06* | (2006.01) | |
| *B32B 5/10* | (2006.01) | |
| *B32B 7/02* | (2006.01) | |
| *F16L 11/10* | (2006.01) | |
| *B29K 23/00* | (2006.01) | |
| *B29K 105/12* | (2006.01) | |
| *B29K 105/16* | (2006.01) | |
| *B29K 507/04* | (2006.01) | |
| *B29L 23/00* | (2006.01) | |

(52) U.S. Cl.
CPC .............. *B32B 5/10* (2013.01); *B32B 7/02* (2013.01); *B32B 25/08* (2013.01); *B32B 25/16* (2013.01); *B32B 27/08* (2013.01); *B32B 27/18* (2013.01); *B32B 27/304* (2013.01); *B32B 27/32* (2013.01); *B32B 27/34* (2013.01); *F16L 11/10* (2013.01); *B29K 2023/12* (2013.01); *B29K 2023/16* (2013.01); *B29K 2105/12* (2013.01); *B29K 2105/16* (2013.01); *B29K 2507/04* (2013.01); *B29K 2995/0005* (2013.01); *B29K 2995/0016* (2013.01); *B29L 2023/005* (2013.01); *B32B 2264/108* (2013.01); *B32B 2274/00* (2013.01); *B32B 2307/202* (2013.01); *B32B 2307/3065* (2013.01); *B32B 2323/10* (2013.01); *B32B 2323/16* (2013.01); *B32B 2377/00* (2013.01); *B32B 2597/00* (2013.01)

(58) Field of Classification Search
CPC ......... B32B 25/08; B32B 27/08; B32B 27/32; B32B 27/34
USPC ....... 138/146, 140, 137, 125, 114, 104, 110; 169/16, 11, 9, 62
See application file for complete search history.

(56) References Cited

U.S. PATENT DOCUMENTS

| | | | | |
|---|---|---|---|---|
| 6,960,388 | B2 * | 11/2005 | Hallissy | C09D 5/185 428/372 |
| 8,127,800 | B2 * | 3/2012 | Ramaswamy | B32B 1/08 138/109 |
| 8,176,943 | B2 * | 5/2012 | Stroempl | F16L 11/125 138/133 |
| 8,962,115 | B2 | 2/2015 | Okabe et al. | |
| 9,045,904 | B2 | 6/2015 | Hubbard et al. | |
| 2003/0008090 | A1 * | 1/2003 | Rohde | B32B 27/20 428/35.7 |
| 2003/0125447 | A1 * | 7/2003 | Hoch | C08K 3/04 524/495 |
| 2007/0190278 | A1 * | 8/2007 | Fukaya | B32B 1/08 428/36.91 |
| 2008/0011383 | A1 | 1/2008 | Paetow et al. | |
| 2008/0188590 | A1 | 8/2008 | Gupta | |
| 2010/0173109 | A1 * | 7/2010 | Okabe et al. | B32B 1/08 428/36.91 |
| 2010/0263195 | A1 | 10/2010 | Niccolls et al. | |
| 2011/0095244 | A1 | 4/2011 | Han et al. | |
| 2013/0150516 | A1 | 6/2013 | Lettow | |
| 2014/0373467 | A1 | 12/2014 | Wang et al. | |
| 2015/0306850 | A1 * | 10/2015 | Hubbard | B32B 27/08 442/1 |
| 2015/0323105 | A1 | 11/2015 | Lee | |

FOREIGN PATENT DOCUMENTS

| | | |
|---|---|---|
| EP | 1396675 A1 | 3/2004 |
| EP | 2184320 A1 | 5/2010 |
| JP | H04165179 A | 6/1992 |
| JP | H07103948 B2 | 11/1995 |
| JP | 2002080612 A | 3/2002 |
| JP | 2008180367 A | 8/2008 |
| WO | 2009032622 A1 | 3/2009 |
| WO | 2010091232 A2 | 8/2010 |
| WO | 2014078661 A1 | 5/2014 |
| WO | 2014078680 A1 | 5/2014 |

OTHER PUBLICATIONS

GrafTech International/Grafguard, Flame Retardant Additive Technical Data Sheet 226, www.graftech.com, May 16, 2014, 3 pages.
Zipper-Technik GmbH, GRAPEX Fire Protection Jacket, Flammschutz, www.zipper-technik.de, Mar. 2015, 2 pages.
English language abstract and machine-assisted English translation for CN203215117U extracted from espacenet.com database on Dec. 1, 2017, 5 pages.
English language abstract and machine-assisted English translation for JPH04165179A extracted from espacenet.com database on Dec. 1, 2017, 5 pages.
English language abstract and machine-assisted English translation for JPH07103948B2 extracted from espacenet.com database on Dec. 6, 2017, 5 pages.
English language abstract and machine-assisted English translation for JP2002080612A extracted from espacenet.com database on Dec. 1, 2017, 13 pages.
English language abstract and machine-assisted English translation for JP2008180367A extracted from espacenet.com database on Jan. 2, 2017, 35 pages.

* cited by examiner

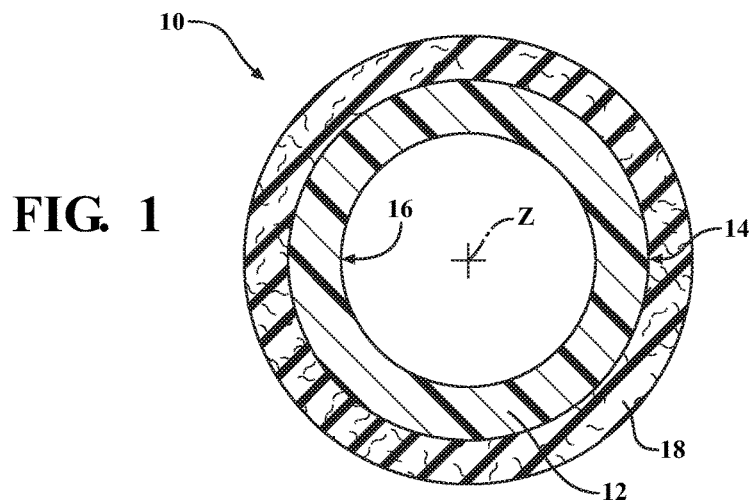
FIG. 1
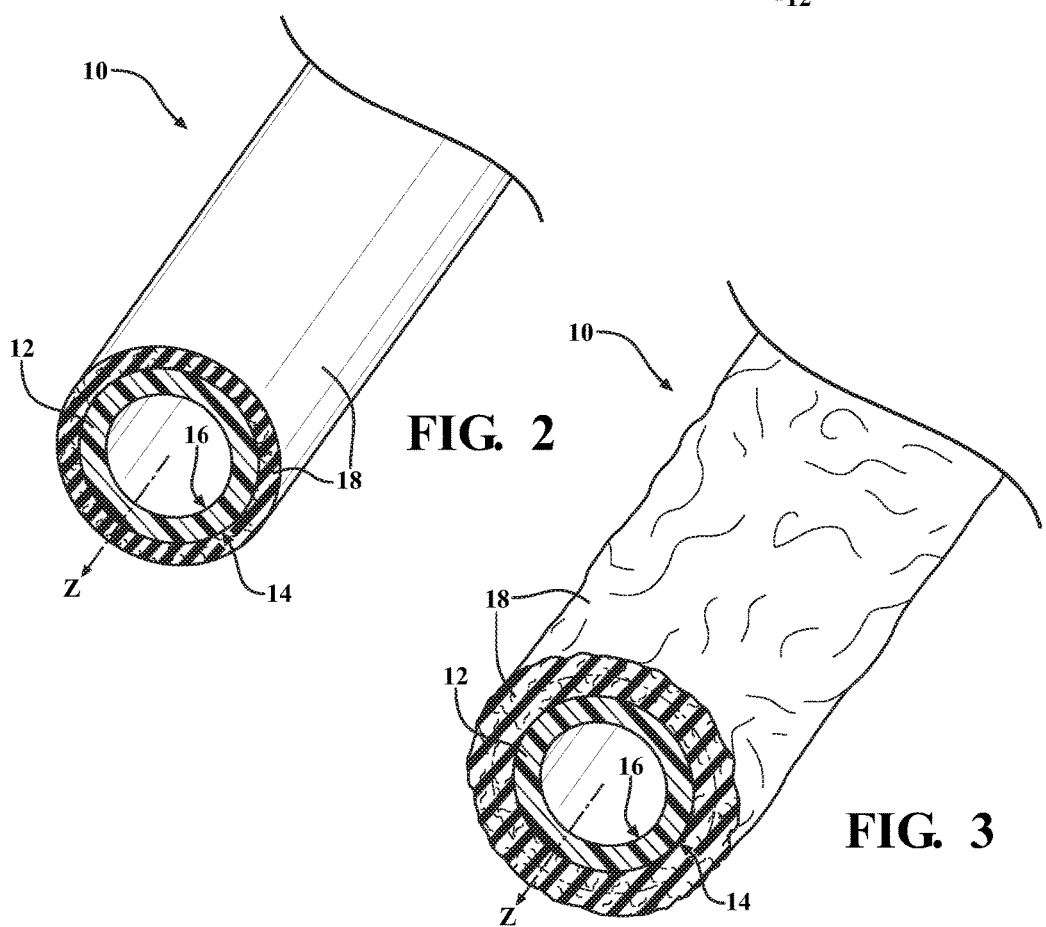
FIG. 2
FIG. 3

FLAME RESISTANT HOSE ASSEMBLY AND METHOD THEREFORE

CROSS REFERENCE TO RELATED APPLICATIONS

This application is the National Stage of International Patent Application No. PCT/US2016/023122, filed on Mar. 18, 2016, which claims the benefit of U.S. Provisional Patent Application Ser. No. 62/136,043, filed on Mar. 20, 2015 and U.S. Provisional Patent Application Ser. No. 62/161,958, filed on May 15, 2015, the disclosures of which are hereby incorporated by reference.

FIELD OF THE DISCLOSURE

The subject invention relates to a hose assembly of the type adapted for conveying fluids, such as fuels and oils.

BACKGROUND OF THE DISCLOSURE

Hose assemblies for conveying fuel and other flammable fluids are well known in the art. These types of hose assemblies are exposed to a variety of fluids, such as fuel mixtures, fuel additives, and chemicals. In many applications, hose assemblies are subjected to physical stresses, such as bending, repeated movement, impact (e.g. by rocks), high internal pressures, internal pressure pulsations, and other forces. In some applications, circumstances may arise where hose assemblies are exposed to flame.

In combustion engines, hose assemblies carry flammable or even explosive fuels such as petrol, diesel, kerosene, compressed and liquefied natural gas, and liquefied petroleum gas. In motor vehicle applications, circumstances arise where hose assemblies carrying such fuels are exposed to flame. For example, the engine of an automobile may catch fire exposing hose assemblies carrying fuel to flame. In such circumstances, hose assemblies which do not exhibit adequate flame resistance can burn, lose their structural integrity, and fail. When the hose assembly fails, the consequences can be severe, flammable fluid flowing through the hose assembly (often times being pumped by a fuel pump which is still running) can be dumped or even sprayed on the flame which caused the failure "adding fuel to the fire". In such applications, flame resistant hose assemblies are required.

Flame resistant hose assemblies typically include a core tube formed from polymeric material and one or more layers disposed thereabout. Such multi-layer hoses tend to be overly bulky and lack durability. Further, some such flame resistant hoses provide some initial flame resistance, but can eventually burn, lose their structural integrity, and fail when exposed to flame. As is described above, when flame resistant hoses fail, the fluids flowing therethrough are directly exposed to the flame which caused the failure; thus, exacerbating the flame and fire.

As such, there remains an opportunity to develop a flame resistant hose assembly that is durable (e.g. physical stresses such as stone impacts) and not overly bulky, which exhibits flame resistance for longer periods of time when exposed to flame.

SUMMARY OF THE DISCLOSURE

A flame resistant hose assembly is disclosed. The hose assembly comprises a tubular inner layer and a flame resistant layer. The tubular inner layer has an interior radial surface and an exterior radial surface and defines a longitudinal axis. The flame resistant layer is disposed about and covers the exterior radial surface of the tubular inner layer and is formed from a flame resistant material.

A method of manufacturing the flame resistant hose assembly is also disclosed. The method comprises the steps of extruding the tubular inner layer and co-extruding the flame resistant material at a temperature of less than about 220° C. to form the flame resistant layer.

The flame resistant material of the flame resistant hose assembly comprises a polymeric binder and expandable graphite in an amount of from about 5 to about 40 parts by weight based on 100 parts by weight of the flame resistant material. The flame resistant layer formed from the flame resistant material expands when heated to a temperature of about 220° C. or greater and maintains a post-expansion coverage of the exterior radial surface of the tubular inner layer of greater than about 95%.

The flame resistant hose assembly and method therefore are efficient and cost-effective. When the flame resistant hose assembly is exposed to exterior flame, the flame resistant layer expands and maintains a post-expansion coverage of the exterior radial surface of the tubular inner layer which further insulates the tubular inner layer, increases the time to ignition and/or time to hose failure (i.e. burn through), reduces heat release and mass loss, and/or reduces smoke and flame spread. In other words, upon exposure to flame, expansion of the flame resistant layer is controlled such that gaps and/or holes are not formed in the flame resistant layer and, thus, protection of the tubular inner layer is maintained. Of course, the flame resistant layer also functions as a protective cover which offers mechanical protection against sharp edges, wear, impact, and other physical forces.

BRIEF DESCRIPTION OF THE DRAWINGS

Advantages of the present disclosure will be readily appreciated as the same becomes better understood by reference to the following detailed description when considered in connection with the accompanying drawings.

FIG. 1 is a cross-sectional view of an embodiment of the hose assembly comprising a tubular inner layer and a flame resistant layer.

FIG. 2 is a partial cross-sectional perspective view of an embodiment of the hose assembly of FIG. 1 which has not been exposed to flame.

FIG. 3 is a partial cross-sectional perspective view of an embodiment of the hose assembly of FIG. 2 which has been exposed to flame.

Figure 4:
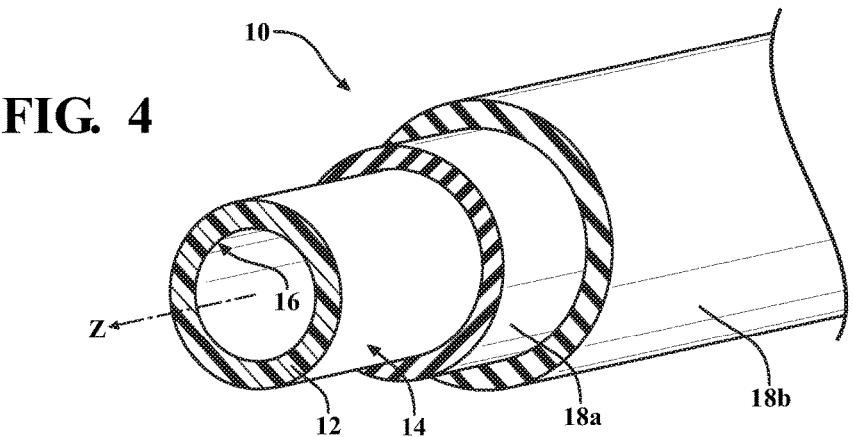
FIG. 4 is a partial cross-sectional perspective view of an embodiment of the hose assembly comprising a tubular inner layer, a first flame resistant layer, and a second flame resistant layer.

The drawings are illustrative of the invention, and it is to be understood that the drawings are not necessarily to scale, and the components within each individual drawing are not necessarily to scale. To this end, the drawings are intended to be descriptive and not limiting in nature. Many modifications and variations of the drawings are possible in light of the teachings below.

DETAILED DESCRIPTION

Referring to the Figures wherein like numerals indicate like or corresponding parts throughout the several views, a flame resistant hose assembly ("hose assembly") is shown at 10. As is described in detail below, the hose assembly 10 comprises a tubular inner layer 12 and a flame resistant layer 18. The tubular inner layer 12 has an interior radial surface 16 and an exterior radial surface 14 and defines a longitudinal axis. The flame resistant layer is disposed about and covers the exterior radial surface 14 of the tubular inner layer. The flame resistant layer 18 expands when heated to a temperature of about 220° C. or greater and maintains a post-expansion coverage of the exterior radial surface 14 of the tubular inner layer 12.

The hose assembly 10 is typically used for conveying fluids, such as fuels, chemicals, etc. The hose assembly 10 is particularly suitable for use in the transportation industry, e.g. in vehicles; however, it is to be appreciated that the hose assembly 10 is not limited to the transportation industry. For example, the hose assembly 10 can be utilized in the chemical industry, the food industry, and any other suitable industries.

Referring to FIG. 1, the hose assembly 10 includes the tubular inner layer 12 defining a tubular configuration along an axis Z. The tubular inner layer 12 is resistant to chemical and thermal degradation. The tubular inner layer 12 has the exterior radial surface 14 that can be smooth or textured. The tubular inner layer 12 has an interior radial surface 16 which is typically smooth such that minimal turbulence is created as fluid flows therethrough.

The tubular inner layer 12 is formed from a polymeric material. The tubular inner layer 12 comprises one or more layers. That is, the tubular inner layer 12 can be a monolayer tubular inner layer 12 or a multilayer tubular inner layer 12. Suitable, non-limiting examples of the polymeric material which can be used to form the one or more layers of the tubular inner layer 12 include polyethylene, polypropylene, polyvinylchloride, polyethylene terephthalate ("PET"), polybutylene terephthalate ("PBT"), polyamides, fluoropolymers, or copolymers thereof. The tubular inner layer 12 can be formed with rubber, e.g. AEM hose. Suitable, non-limiting examples of particular polyamides include PA11, PA12, PA610, PA612, PA1010, PA6, PA66, PA1110T, PA1212T, and combinations thereof. Suitable, non-limiting examples of particular fluoropolymers include polytetrafluoroethylene ("PTFE"), Fluorinated Ethylene Propylene ("FEP"), Perfluoroalkoxy ("PFA"), and ethylenetetrafluoroethylene ("ETFE").

In a preferred embodiment, the tubular inner layer 12 comprises polyamide. In many embodiments, the tubular inner layer 12 comprising polyamide exhibits excellent performance properties when exposed to fluid and ambient temperatures as high as 125° C.

In another preferred embodiment, the tubular inner layer 12 comprises a fluoropolymer such as PTFE. In many embodiments, the tubular inner layer 12 comprising fluoropolymer exhibits excellent performance properties when exposed to aggressive/corrosive fuels (e.g. biofuels such as SMG fuel) and fluid and ambient temperatures as high as 125° C.

In various embodiments, the tubular inner layer 12 is a multilayer tubular inner layer 12 wherein the layers (or sub layers) comprise different materials and, thus, provide advantages associated with the different materials. For example, the multilayer tubular inner layer 12 can comprise an inner layer which is thermally stable and an outer layer which softens during formation of the hose assembly 10 so that an adjacent layer (e.g. the flame resistant layer 18) can embed in the outer layer to provided excellent adhesion with the tubular inner layer 12. As another example, the multilayer tubular inner layer 12 may include an inner layer comprising fluorocarbon polymer that defines the interior radial surface 16 which is resistant to chemical and thermal degradation due to the fluid which flows through the tubular inner layer 12 and an outer layer comprising polyamide that defines the exterior radial surface 14 which is durable and provides excellent high temperature resistance. As yet another example, the multilayer tubular inner layer 12 may include an inner layer comprising fluorocarbon polymer that defines the exterior radial surface 14 which is resistant to chemical and thermal degradation due to the fluid which flows through the tubular inner layer 12, another layer that is impermeable and reduces evaporation of the fluid which flows through the tubular inner layer 12, and an outer layer comprising polyamide that defines the exterior radial surface 14 which is durable and provides excellent high temperature resistance.

In some embodiments, the hose assembly 10 includes a surface treatment. The surface treatment is disposed on the exterior radial surface 14 of the tubular inner layer 12. Suitable surface treatments include, but are not limited to, a coupling agent, a primer, and/or various other surface treatments such as physical, chemical, plasma, or corona etching. If applied, the surface treatment is typically applied to the exterior radial surface 14 of the tubular inner layer 12 to facilitate bonding of materials (e.g. a flame resistant material) thereto.

In various embodiments, the tubular inner layer 12 is electrically conductive. The tubular inner layer 12 can also include an integral conductor along a length of the tubular inner layer 12 for preventing buildup of electrical charge. As fluid flows through the tubular inner layer 12, electrical charges tend to build up throughout the length of the tubular inner layer 12. In order to prevent these electrical charges from accumulating, in various embodiments, the tubular inner layer 12 has the integral conductor which functions as an integral longitudinal conductive means coextensive with the length of the tubular inner layer 12 for conducting an electrical charge. In one specific embodiment, the integral conductor is a conductive strip of carbon black, e.g. the tubular inner layer 12 has a conductive strip of carbon black. Carbon black is electrically conductive and will dissipate any electrical charges built up by the fluid. This is done by using carbon black about the tubular inner layer 12. It should be appreciated that other conductive material may be used to form the integral conductor.

In one specific embodiment, the tubular inner layer 12 is a monolayer tubular inner layer 12 comprising PTFE formed from an inner material (e.g. conductive PTFE) and an outer material (e.g. non-conductive PTFE) and, thus, the exterior radial surface 14 of the monolayer tubular inner layer 12 is conductive. Alternatively, the entire monolayer tubular inner layer 12 can comprise the conductive means, e.g. can be formed from conductive PTFE. Alternatively, the tubular inner layer 12 can comprise a conductive inner layer and a non-conductive outer layer.

Still referring to FIG. 1, the hose assembly 10 further includes the flame resistant layer 18 for increasing the flammability resistance of the hose assembly 10. The flame resistant layer 18 is disposed about the exterior radial surface 14 of the tubular inner layer 12 and formed from a flame resistant material.

The flame resistant layer 18 is typically disposed about the exterior radial surface 14 of the tubular inner layer 12. That said, in describing the flame resistant layer 18 as disposed about the exterior radial surface 14 of the tubular inner layer 12, it should be understood that there may be one or more intermediate layers disposed between the tubular inner layer 12 and the flame resistant layer 18. In such embodiments, the flame resistant layer 18 is disposed about the exterior radial surface 14 of the tubular inner layer 12 with one or more intermediate layers disposed therebetween. For example, referring now to the hose assembly 10 of FIGS. 5 and 6, the embodiment shown includes a tubular inner layer 12, a reinforcing layer 20 disposed about the tubular inner layer 12, and a flame resistant layer 18 disposed about the reinforcing layer 20. Alternatively, it should also be understood that there may be additional layers disposed about the exterior radial surface of the flame resistant layer 18. Of course, the hose assembly 10 can include one or more flame resistant layers 18.

The flame resistant layer 18 is formed from a flame resistant material. The flame resistant material of the hose assembly 10 comprises a polymeric binder and expandable graphite.

Referring now to the polymeric binder, the polymeric binder can comprise one or more polymers. Suitable polymers for purposes of the subject disclosure include various extrudable polymers known in the art. Suitable, non-limiting examples of polymers which can be included in the flame resistant material include elastomers, thermoplastics, and various combinations thereof (e.g. thermoplastic elastomers). Suitable, non-limiting examples of polymers include polyethylene, polypropylene, polyvinylchloride, polyethylene terephthalate (PET), polybutylene terephthalate (PBT), polyamides, fluoropolymers, or copolymers thereof. Suitable, non-limiting examples of particular polyamides include PA11, PA12, PA610, PA612, PA1010, PA66, PA1110T, PA1212T, and blends thereof. Suitable, non-limiting examples of particular fluoropolymers include polytetrafluoroethylene (PTFE), Fluorinated Ethylene Propylene (FEP), Perfluoroalkoxy (PFA), and ethylenetetrafluoroethylene (ETFE). Suitable, non-limiting examples of thermoplastic elastomers include polymers formed from thermoplastic materials (e.g. PP, PBT or PA) and elastomers. Specifically, suitable, non-limiting examples of thermoplastic elastomers include TPE-O (thermoplastic olefins, hard/ soft blends), TPE-S (styrenics such as SBS, SETTS, and SEPS), TPE-V (vulcanized PP/EPDM compounds), TPE-E (copolyester compounds), TPE-U (thermoplastic polyurethanes), and TPE-A (thermoplastic polyamides). In some embodiments, the flame resistant material further comprises silicone.

In a preferred embodiment, the polymeric binder comprises EPDM and polypropylene. In such an embodiment, the flame resistant material can be described as a thermoplastic elastomer or as a thermoplastic vulcanizate ("TPV").

In another preferred embodiment, the polymeric binder comprises EPDM and polyamide. In such an embodiment, the flame resistant material can be described as a thermoplastic elastomer or a TPV.

In some embodiments, the polymeric binder comprises or consists essentially of a TPV, the TPV can include of from about 10 to about 70, alternatively from about 20 to about 60, alternatively from about 30 to about 50, alternatively about 40, parts by weight thermoplastic (e.g. polypropylene) based on 100 parts by weight of the TPV. In embodiments where the polymeric binder comprises or consists essentially of a TPV, the TPV can include of from about 30 to about 90, alternatively from about 40 to about 80, alternatively from about 50 to about 70, alternatively about 60, parts by weight elastomer (e.g. EPDM) based on 100 parts by weight of the TPV.

The polymeric binder typically has a softening point which is less than the temperature at which the expandable graphite, which is described in detail below, starts expanding. For example, the polymeric binder typically has a softening point of less than about 190, alternatively less than about 200, alternatively less than about 210, alternatively less than about 220, alternatively less than about 230, alternatively less than about 240, alternatively less than about 250, ° C.

In various embodiments, the flame resistant material includes the polymeric binder in an amount of from about 10 to about 95, alternatively from about 60 to about 90, alternatively from about 70 to about 90, alternatively from about 75 to about 85, parts by weight based on 100 parts by weight of the flame resistant material.

Referring now to the expandable graphite, the expandable graphite can be present in the bonder in particulate, flake, and/or fiber form. The expandable graphite may be referred to in the art as expandable flake graphite, intumescent flake graphite, or expandable flake.

In various embodiments, the expandable graphite is included in the flame resistant layer 18 in the form of particles and/or flakes having a mean or average particle size of from about 1 μm to about 1000 μm, alternatively from about 1 μm to about 500 μm, alternatively from about 50 μm to about 400 μm, alternatively from about 200 μm to about 400 μm.

The expandable graphite typically consists of stacks of parallel planes of carbon atoms. Because no covalent bonding exists between the planes, other molecules can be inserted between them. This process of inserting the other molecules between the parallel planes of carbon atoms, known in the art as intercalation, facilitates the expansion of the graphite. When the expandable graphite is exposed to heat or flame, the inserted molecules decompose to generate gas, the parallel planes of graphite are forced apart by the gas, and the graphite expands. The expandable graphite is fully expanded when the molecules inserted during intercalation have decomposed and no more gas can be generated and no more expansion can occur. The expanded graphite is typically low-density, non-burnable, thermally insulative, and reflects radiant heat. The expandable graphite of the subject invention typically starts expanding (e.g. has an onset temperature) at temperatures greater than about 160, alternatively greater than about 180, alternatively greater than about 200, alternatively greater than about 210, alternatively greater than about 230, alternatively greater than about 240, alternatively greater than about 250, alternatively greater than about 260, alternatively greater than 270, ° C. In various preferred embodiments, the expandable graphite has an onset temperature of from about 250 to about 400° C. with ranges therebetween contemplated herein. In a preferred embodiment, the expandable graphite has an onset temperature of about 220° C. In another embodiment, the expandable graphite has an onset temperature of about 250° C. The flame resistant material having the expandable graphite therein which has higher onset of expansion temperatures can be co-extruded without exhibiting premature expansion. Accordingly, the expandable graphite can be compounded with the polymeric binder to form the flame resistant material, and the flame resistant material can be co-extruded with the tubular inner layer 12 and/or other layers, e.g. a reinforcing layer 20, without premature expansion to form the hose assembly 10. In some embodiments, some premature expansion or pre-expansion is desired during co-extrusion.

In various embodiments, the expandable graphite has a carbon content in the range from about 20 to about 99%, alternatively from about 30 to about 90%. In various embodiments, the expandable graphite has a percent volumetric expansion of from about 50 to about 500%, alternatively from about 10 to about 300%, alternatively from about 50 to about 300%, alternatively from about 100 to about 300%, at 600° C. Percent volumetric expansion can be defined as the % change volume, i.e., the final volume of a sample divided by the initial volume of the sample multiplied by 100. The sample is heated to a temperature of from about 500 to about 750° C. (e.g. to about 600° C., about 700° C.) to achieve the final volume of the sample. In one method, a Bunsen burner is used to heat the sample to a temperature of about 700° C. to test expansion. In one method, a natural gas torch is used to heat the sample to a temperature of about 700° C. to test expansion. Alternatively, in various embodiments, the expandable graphite expands to greater than about 10, alternatively greater than about 20, alternatively greater than about 30, alternatively greater than about 40, alternatively greater than about 50, alternatively greater than about 60, alternatively greater than about 70, alternatively greater than about 80, alternatively greater than about 90, alternatively greater than about 100, times its original thickness when heated to a temperature of 600° C.

In various embodiments, the flame resistant material includes the expandable graphite in an amount of from about 5 to about 90, alternatively from about 5 to about 40, alternatively from about 10 to about 40, alternatively from about 10 to about 30, alternatively from about 15 to about 30, alternatively from about 15 to about 25, alternatively from about 20 to about 30, parts by weight based on 100 parts by weight of the flame resistant material.

The flame resistant material may also include one or more additives. Suitable additives may include, but are not limited to, curatives, processing additives, adhesion promoters, antioxidants, ultraviolet light stabilizers, fillers, thixotropic agents, silicones, dyes/colorants, and combinations thereof. For example, in one embodiment, the flame resistant material comprises reinforcing fibers such as glass fibers which are also flame resistant.

Referring now to the flame resistant layer 18, the flame resistant layer is disposed about and covers the exterior radial surface 14 of the tubular inner layer 12. Disposed about and "covers" is defined herein as covering 100% of the exterior radial surface 14 of the tubular inner layer 12.

The flame resistant layer 18 can expand and form insulative char to further insulate the tubular inner layer 12, increase the time to ignition and/or time to hose failure, reduce heat release and mass loss, and/or reduce smoke and flame spread when the hose assembly 10 is exposed to flame and high temperatures associated with the flame. The flame resistant layer 18 can also function as a protective cover which offers mechanical protection against sharp edges, against wear, stone impact, and other physical forces.

The flame resistant layer 18, which comprises the polymeric binder and the expandable graphite, expands when heated to a temperature of about 220° C. or greater and maintains a post-expansion coverage of the exterior radial surface 14 of the tubular inner layer 12 of greater than about 95%, alternatively about 96%, alternatively about 97%, alternatively about 98%, alternatively about 99%, alternatively about 100%. That is, the hose assembly 10 of the subject invention is particularly effective because when the flame resistant layer 18 is exposed to external flame and high temperatures associated with the flame, the flame resistant layer 18 does not pull off of the exterior radial surface 14 of the tubular inner layer, and the flame resistant layer 18 does not split or tear and expose the tubular inner layer 12 due to the expansion or "worming" of the expandable graphite. In other words, the flame resistant material of the subject disclosure exhibits controlled expansion when exposed to external flame completely covering or surrounding the tubular inner layer 12. It is believed that the composition of the flame resistant material described herein is the reason that the flame resistant layer 18 maintains a post-expansion coverage of the exterior radial surface 14 of the tubular inner layer 12 and, thus, further insulates the tubular inner layer 12, increases the time to ignition and/or time to hose failure (i.e. burn through), reduces heat release and mass loss, and/or reduces smoke and flame spread when the hose assembly 10 is exposed to flame over extended periods of time. That is, when the hose assembly is exposed to flame, the flame resistant layer increases the time to burn through so that the time to the point where fuel conveyed by the hose is flowing into the flame is increased and the flame and fire is kept to a minimum.

In some embodiments, the flame resistant layer 18 maintains from about 95 to about 100% coverage of the exterior radial surface 14 of the tubular inner layer 12 when exposed to flame (e.g. flame produced by the burning of nature gas) for up to 2 minutes, alternatively up to 4 minutes, alternatively up to 6 minutes, alternatively up to 8 minutes, alternatively up to 10 minutes, alternatively up to 12 minutes, alternatively up to 14 minutes, alternatively up to 16 minutes, alternatively up to 18 minutes, or even more minutes.

This post-expansion coverage of the exterior radial surface 14 by the flame resistant layer 18 is exemplified by FIGS. 2 and 3. FIG. 2 is a partial cross-sectional perspective view of an embodiment of the hose assembly 10 comprising the tubular inner layer 12 and the flame resistant layer 18 which has not been exposed to flame and high temperature. FIG. 3 is a partial cross-sectional perspective view of an embodiment of the hose assembly 10 of FIG. 2 which has been exposed to flame and high temperature. As is apparent in FIG. 3, the post-expansion coverage of the flame resistant layer 18 on the exterior radial surface 14 of the tubular inner layer 12 is about 100%, with tearing or release from the exterior radial surface 14 of the tubular inner layer 12.

In various embodiments, the flame resistant layer 18 has a volumetric expansion of from about 25 to about 500%, alternatively from about 50 to about 300%, alternatively from about 50 to about 200%, alternatively from about 50 to about 150%, when heated to a temperature of about 220° C. or greater.

In some embodiments, the tubular inner layer 12 and the flame resistant layer 18 can be chemically bonded (e.g. crosslinked) with one another and/or mechanically bonded with one another. In still other embodiments, the tubular inner layer 12 and the flame resistant layer 18 are bonded together via an adhesive or a binder. When the flame resistant layer is chemically bonded to the tubular inner layer 12 or an intervening layer (e.g. an anti-permeation layer 24) the flame resistant layer 18 is more likely to maintain contact with and maintain coverage over the exterior radial surface of the tubular inner layer 18, thereby improving the flame resistance of the hose assembly 10.

The hose assembly 10 can include one or more additional layers including, but not limited to, reinforcing layers 20, binder layers 22, anti-permeation layers 24, and protective layers 26. The type and amount of layers included in the hose assembly 10 depends on the intended use of the hose assembly 10.

Referring now to FIG. 4, an embodiment of the hose assembly 10 comprising multiple layers is shown. Specifically, a partial cross-sectional perspective view of the hose assembly 10 comprising a tubular inner layer 12, a first layer, or alternatively, a flame resistant layer 18a disposed about the exterior radial surface 14 of the tubular inner layer 12, and another flame resistant layer 18b disposed about an exterior radial surface 14 of the first flame resistant layer 18a is shown. In this embodiment, the tubular inner layer 12 can comprise one or more layers. In such an embodiment, the first flame resistant layer 18a can comprise TPV and expandable graphite in an amount of from about 0 to about 40% by weight based on 100 parts by weight of the flame resistant material, and the second flame resistant layer 18b can comprise TPV and expandable graphite in an amount of from about 20 to about 40% by weight based on 100 parts by weight of the flame resistant material. In such an embodiment, the flame resistance is concentrated on the outside of the hose assembly 10.

Figure 5:
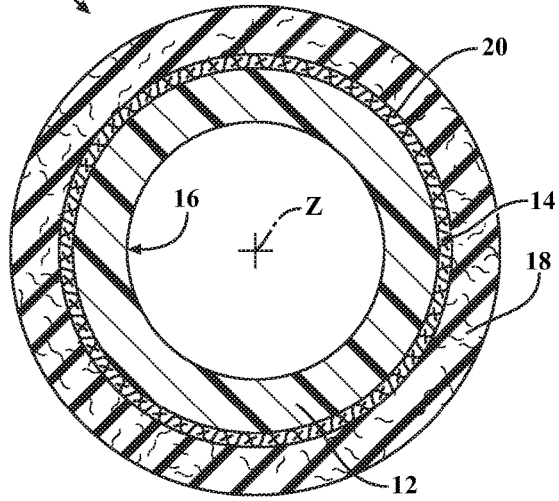
FIG. 5 is a cross-sectional view of an embodiment of the hose assembly comprising a tubular inner layer, a reinforcing layer, and a flame resistant layer.
Figure 6:
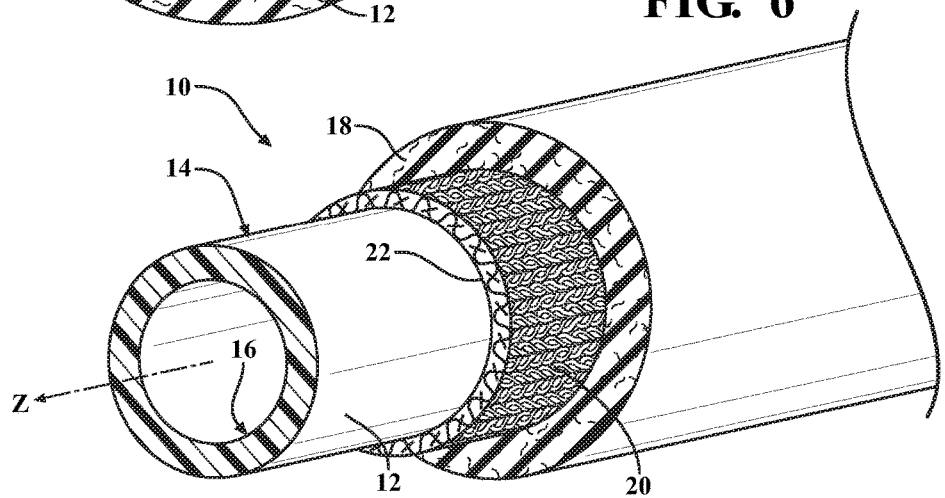
FIG. 6 is a partial cross-sectional perspective view of the hose assembly of FIG. 5.

The hose assembly 10 can include one or more reinforcing layers 20. The reinforcing layer 20 can be included between the tubular inner layer 12 and the flame resistant layer 18 and/or included outside of the flame resistant layer 18. For example, FIG. 5 illustrates an embodiment of the hose assembly 10 comprising a tubular inner layer 12, a reinforcing layer 20 disposed about the exterior radial surface 14 of the tubular inner layer 12, and a flame resistant layer 18 disposed about the exterior radial surface 14 of the reinforcing layer 20. FIG. 6 is a partial cross-sectional perspective view of the hose assembly of FIG. 5.

In an alternative embodiment, the hose assembly 10 can include a tubular inner layer 12, a flame resistant layer 18, and a reinforcing layer 20 disposed about an exterior radial surface of the flame resistant layer 18. In such an embodiment, the reinforcing layer 20 further restricts the expansion of the flame resistant layer 18 when the hose assembly 10 is exposed to exterior flame and high temperature. In turn, post-expansion coverage of the exterior radial surface 14 of the tubular inner layer 12 is maintained by the flame resistant/char layer and, thus, further insulates the tubular inner layer 12, increases the time to ignition and/or time to hose failure, reduces heat release and mass loss, and/or reduces smoke and flame spread when the hose assembly 10 is exposed to exterior flame and high temperature over extended periods of time.

The reinforcing layer 20 comprises reinforcing fibers that are braided, helically wound, knitted, or wrapped about the exterior radial surface 14 of the tubular inner layer 12 (with or without the flame resistant layer 18 therebetween). The reinforcing layer 20 can comprise one or more different types of reinforcing fibers. The reinforcing fibers are typically in the form of monofilament, multifilament, or staple yarn (reinforcing yarn). The reinforcing yarn can comprise one or more types of reinforcing fibers. The reinforcing fibers typically comprise a polymer, a ceramic, a fiberglass, a metal, a mineral, or combinations thereof. In one embodiment, the reinforcing fibers comprise fiberglass. Examples of suitable glass reinforcing fibers include, but are not limited to, E-glass (alumina-calcium-borosilicate), S2 glass (magnesium-alumino-silicate), C glass (calcium borosilicate), R glass (calcium-alumino-silicate), silica, quartz, basalt yarn, and combinations thereof. Examples of other suitable fibers include, but are not limited to, basalt fiber (or yarn), ceramic fiber, aramid fiber (e.g. NOMEX® and KEVLAR® fiber), semi-aromatic aramid fiber, and combinations thereof. Of course, as is set forth above, one or more different types of reinforcing fibers can be used, i.e., blends of any of the reinforcing fibers described herein can be used. In a preferred embodiment, the reinforcing fibers comprise E-glass fiber. Reinforcing fibers comprising fiberglass provide strength to reinforce the tubular inner layer 12 and are thermally stable at elevated temperatures, which is beneficial for use in high temperature environments, e.g. under the hood of vehicles.

As is set forth above, some embodiments of the hose assembly 10 include a flame resistant layer 18 with a reinforcing layer 20 disposed about and covering an exterior radial surface of the flame resistant layer 18. In such embodiments, the reinforcing layer 20 further restricts the expansion of the flame resistant layer 18 when the hose assembly 10 is exposed to exterior flame and high temperature.

In some such embodiments, the reinforcing layer 20 covers greater than about 40, alternatively greater than about 50, alternatively greater than about 60, alternatively greater than about 70, alternatively greater than about 80, alternatively greater than about 90, alternatively greater than about 95, % of the exterior radial surface 14 of the tubular inner layer 12. For example, the braided reinforcing layer 20 could cover from about 80 to about 100, alternatively from about 90 to about 100, alternatively from about 95 to about 100, alternatively about 100, % of the exterior radial surface 14 of the flame resistant layer 18. In such embodiments, the braid of the reinforcing layer 20 is closed, and would restrict or even stop expansion of the flame resistant layer 18 through the braid of the reinforcing layer 20 in effect squeezing the tubular inner layer 12 thereby reducing the inner diameter of the tubular inner layer 12 and closing hose thereby stopping all fluid to flow out. That is, upon exposure to flame, this embodiment can restrict or even close the inner-diameter of the tubular inner layer 12 of the hose assembly 10 and reduce or totally stop fuel from flowing out of the hose preventing burn-through and fuel from the hose assembly 10 from flowing into the flame.

In other such embodiments, the reinforcing layer 20 covers less than about 70, alternatively less than about 60, alternatively less than about 50, alternatively less than about 40, alternatively less than about 30, alternatively less than about 20, % of an exterior radial surface 14 of the flame resistant layer 18 such that the expansion of the flame resistant layer 18 is restricted, but the flame resistant layer 18 can still partially expand through the reinforcing layer 20. For example, the braided reinforcing layer 20 could cover from about 10 to about 70, alternatively from about 20 to about 50, alternatively from about 20 to about 40, alternatively from about 1 to about 15, alternatively from about 2 to about 10, % of the exterior radial surface 14 of the flame resistant layer 18.

Figure 7:
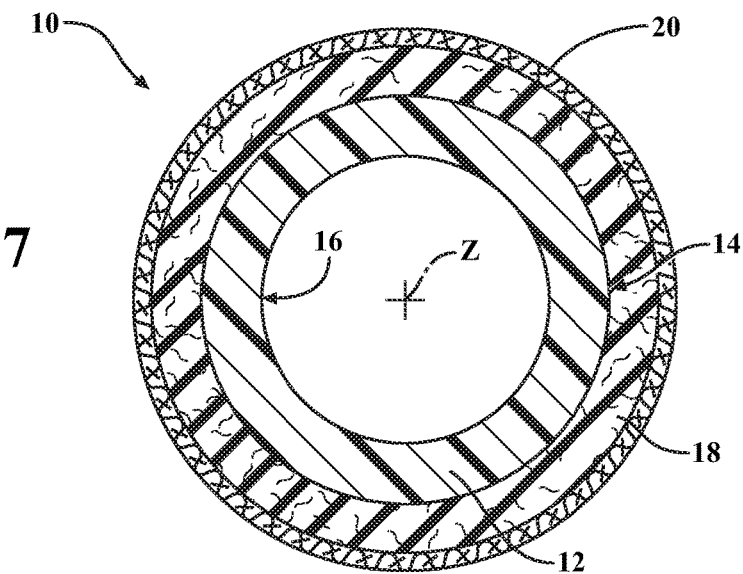
FIG. 7 is a partial cross-sectional perspective view of the hose assembly comprising a tubular inner layer, a flame resistant layer, and a reinforcing layer.
Figure 8:
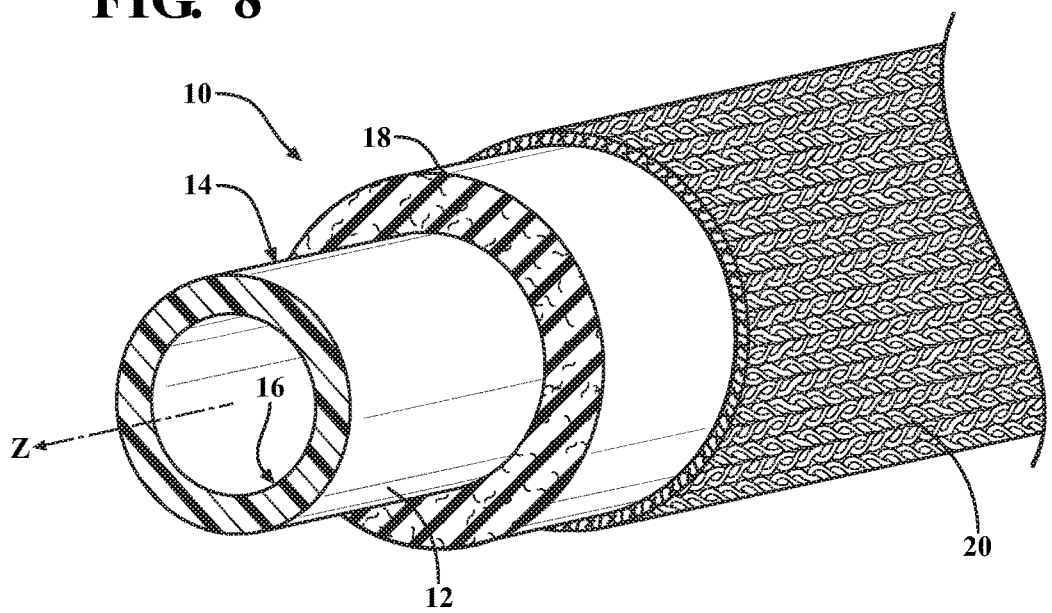
FIG. 8 is a partial cross-sectional perspective view of the hose assembly of FIG. 7.

Referring now to FIG. 7, an embodiment of the hose assembly 10 comprising multiple layers is shown. Specifically, a partial cross-sectional perspective view of the hose assembly 10 comprising a tubular inner layer 12, a flame resistant layer 18 disposed about the exterior radial surface 14 of the tubular inner layer 12, and a reinforcing layer 20 (with an open braid) disposed about the exterior radial surface 14 of the flame resistant layer 18 but not covering the entire exterior radial surface 14 of the flame resistant layer 18 is shown. In the embodiment of FIG. 7, the reinforcing layer 20 protects the flame resistant layer 18 from wear and tear and is also open so that the flame resistant layer 18 can expand through the open braids of the reinforcing layer 20 upon exposure to flame/heat. FIG. 8 is a partial cross-sectional perspective view of the hose assembly of FIG. 7.

In some embodiments, the reinforcing fibers comprise a polymer, a ceramic, a fiberglass, a metal, or combinations thereof, which are coated with a polymeric binder. In some embodiments, the reinforcing layer 20 can comprise a polymeric binder. In a typical embodiment, the polymeric binder binds (1) the reinforcing fibers within the reinforcing layer 20 together, and (2) the strands of reinforcing yarn to the surfaces of any adjacent layers. Suitable polymeric binders can include, but are not limited to, polyethylene, polypropylene, polyvinylchloride, PET, PBT, polyamide, fluoropolymer, and copolymers thereof.

In some embodiments the polymeric binder is coated on the reinforcing fibers. In other embodiments, the binder is applied in an emulsion, e.g., the hose assembly 10 including the tubular inner layer 12 and the flame resistant layer 18 having a reinforcing layer 20 thereon is dipped in an emulsion comprising a polymeric material and then heated to form the reinforcing layer 20.

In some embodiments, the binder is formed from binding fibers. The use of binding fiber is described in WO/2014/078661 and WO/2014/078680, the entirety of which is incorporated by reference herein. That is, in some embodiments, the reinforcing layer 20 is formed from binding fibers. If binder fibers are used to form the reinforcing layer 20, the reinforcing layer 20 can be formed from one or more different types of binding fibers. The binding fibers are typically in the form of monofilament strands or multifilament yarn. Examples of polymers suitable for the binding fibers include, but are not limited to, polyethylene, polypropylene, polyvinylchloride, PET, PBT, polyamide, fluoropolymer, and copolymers thereof.

If binding fibers are used to make the reinforcing layer 20, different types of binding fibers can be used. For example, if used, the binding fibers can include binding fibers comprising different polymers or having different diameters. To this end, the reinforcing layer 20 can be formed with varying amounts and different types of binding fibers. For example, the binding fibers can include binding fibers comprising different polymers or having different diameters.

As alluded to above, the hose assembly 10 can include one or more binder layers 22. The binder layer is formed from the polymeric binder described above which typically comprises a polymer or blend of polymers and other additives. The binder layer 22 provides strength and durability to the hose assembly 10 and facilitates bonding between different layers comprising materials which may not adhere well to one another.

As one example of a protective layer 26, the hose assembly 10 can include a silicone layer (e.g. a silicone layer or jacket). As another example, the hose assembly 10 can include a TPV layer (e.g. a TPV layer or jacket). As yet another example, the hose assembly 10 can include a polyamide layer (e.g. a polyamide layer or jacket).

Figure 9:
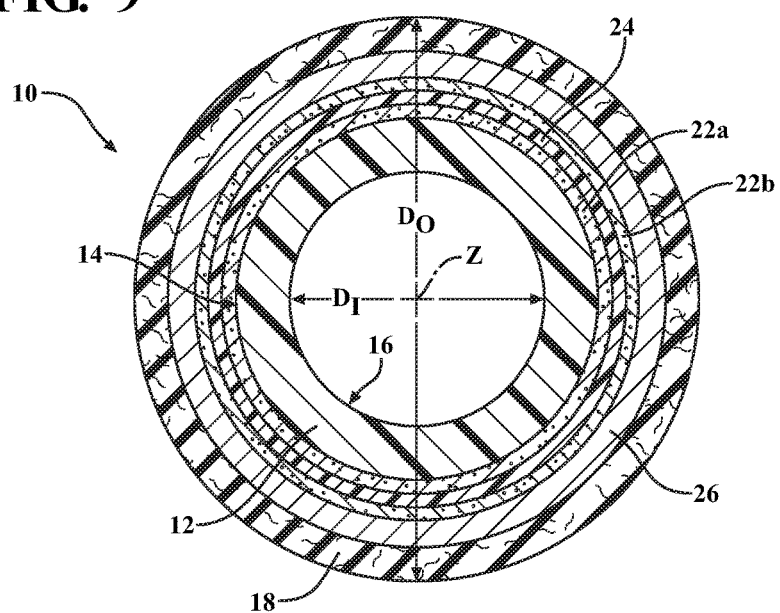
FIG. 9 is a cross-sectional view of an embodiment of the hose assembly comprising a tubular inner layer, a first binder layer, an anti-permeation layer, a second binder layer, a protective layer, and a flame resistant layer.

One example of a multi-layer tube is FIG. 9. FIG. 9 is a cross-sectional view of an embodiment of the hose assembly 10 comprising a tubular inner layer 12, a first binder layer 22, an anti-permeation layer 24, a second binder layer 22, a protective layer 26, and a flame resistant layer 18. The hose assembly 10 has an inner diameter ($D_I$), an outer diameter ($D_O$), and a length (L). The inner diameter, the outer diameter, and the length of the hose assembly 10 can vary depending on the intended use of the hose assembly 10. For example, the hose assembly 10 can have an inner diameter of two inches for use in applications that require transfer of greater volumes of fluid or an inner diameter of a half of an inch for use in applications that require transfer of lesser volumes of fluid.

Still referring to FIG. 9, an embodiment of the hose assembly 10 comprising multiple layers is shown. The hose assembly 10 of FIG. 9 includes six distinct layers. Specifically, the hose assembly 10 of FIG. 9 is designed for fuel applications, e.g. conveying fuels such as gasoline, ethanol, ethanol/gasoline mixtures, diesel, and biodiesel. The hose assembly 10 of FIG. 9 has an internal diameter $D_I$ of about 6 mm and an outer diameter $D_O$ of about 8 mm.

Still referring to FIG. 9, the tubular inner layer 12 (first layer) comprises ETFE. The ETFE of this embodiment is resistant to physical or chemical degradation, even upon exposure to aggressive fuels such as biodiesel, and, thus, imparts fuel resistance properties on the tubular inner layer 12 and hose assembly 10 formed therefrom. The ETFE of this embodiment is also conductive. That is, the ETFE is compounded with, for example, carbon-black, to impart conductive properties on the tubular inner layer 12 formed therefrom. The tubular inner layer 12 having conductivity is often preferred for fuel applications because a conductive tubular inner layer 12 provides anti-static properties and, thus, allows for the electrical discharge of static buildup which can be caused by the flowing of fuel through the tubular inner layer 12. In one embodiment, the tubular inner layer 12 has a thickness of about 0.1 mm.

Still referring to FIG. 9, a first binder layer 22*a* (second layer) comprises polyamide (a polyamide binder). The first binder layer 22*a* provides the hose assembly 10 with mechanical strength and also provides a robust bond between the tubular inner layer 12 which comprises ETFE and the anti-permeation layer 24 (third layer) which comprises ethylene vinyl alcohol (EVOH). EVOH is a copolymer of ethylene and vinyl alcohol which imparts low permeability on the hose assembly 10 formed therefrom. ETFE and EVOH do not readily bond with one another. In one embodiment, the first binder layer 22*a* has a thickness of about 0.3 mm and the anti-permeation layer 24 has a thickness of about 0.1 mm.

Still referring to FIG. 9, a second binder layer 22*b* (fourth layer) comprises a binder comprising a polyamide. The polyamide binder provides the hose assembly 10 with thermal resistance and mechanical strength and also provides a robust bond between the anti-permeation layer 24 (third layer) comprising EVOH and protective layer 26 (fifth layer)

comprising polyamide which is included to impart strength, durability, and burst resistance to the hose assembly 10. In one embodiment, the second binder layer 22b has a thickness of about 0.3 mm and the protective layer 26 has a thickness of about 0.4 mm.

Still referring to FIG. 9, a flame resistant layer 18 (sixth layer) is included as an outermost layer. The flame resistant layer 18 of this embodiment comprises a polymeric binder comprising TPV and expandable graphite. The TPV provides durability while the expandable graphite provides flame resistance. In one embodiment, the flame resistant layer 18 has a thickness of about 1.5 mm.

In an embodiment such as that of FIG. 9, an 8×1 hose assembly 10 could have a typical layer thickness of about 1.5 mm, which would result in an inner diameter $D_I$ of about 6 mm and an outer diameter $D_O$ of about 11 mm. That said, the layers described above can be thinner or thicker than described above depending on the application or depending on the properties desired.

In another multilayer embodiment, the hose assembly 10 comprises a tubular inner layer 12, a reinforcing layer 20 comprising glass and/or polyamide fiber disposed about the exterior radial surface 14 of the tubular inner layer 12, a binder layer 22 formed via impregnation with a PTFE emulsion disposed within the voids in the reinforcing layer 20, a binder layer 22 formed via impregnation with a PTFE emulsion disposed within the voids in the reinforcing layer 20, and a flame resistant layer 18 comprising TPV and expandable graphite disposed about the exterior radial surface 14 of the reinforcing/binder layers 20, 22.

The hose assembly 10 can further include a coupling 30. Typically the coupling 30 is adapted to engage at least one end of the hose assembly 10 for interconnecting the hose assembly 10 to a fluid source, such as a fuel tank. It is to be appreciated that any suitable coupling 30 can be used with the hose assembly 10. For example, a coupling 30 including a threaded insert, a fir-tree insert, or a crimped insert can be employed to couple the hose assembly 10 to the fluid source.

Figure 10:
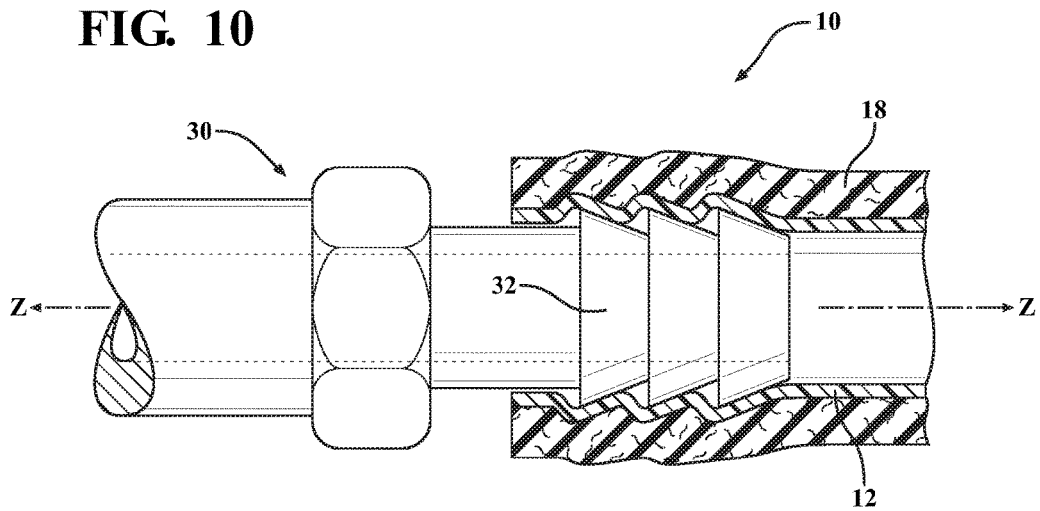
FIG. 10 is a side view of a coupling having a fir-tree insert which is coupled to a hose assembly with the hose assembly comprising a tubular inner layer and a flame resistant layer (e.g. the hose assembly of FIGS. 1 and 2) and shown in cross-section.

For example, a coupling 30 comprising a fir-tree insert 32 that goes inside the hose assembly 10 can be used to couple the hose assembly 10 to a fluid source. A fir-tree insert 32 may be beneficial because the insert-area is also protected from fire by the graphite around it. Referring now to FIG. 10, a side view of a coupling 30 having a fir-tree insert 32 which is coupled to a hose assembly 10 with the hose assembly 10 comprising a tubular inner layer 12 and a flame resistant layer 18 and shown in cross-section is illustrated. Still referring to FIG. 10, as one non-limiting example, the coupling 30 can comprise metal, the hose assembly 10 can comprise a tubular inner layer 12 comprising polyamide as well as a flame resistant layer 18 comprising TPV and expandable graphite. The area where the fir-tree insert 32 is located is also protected by the flame resistant layer 18 which imparts additional flame resistance to the coupling 30. Normally the coupling 30 can be a weak-point with respect to fire-resistance because the hose can melt and lose connection, so the extra flame resistance offered by the flame resistant layer 18 is beneficial.

Figure 11:
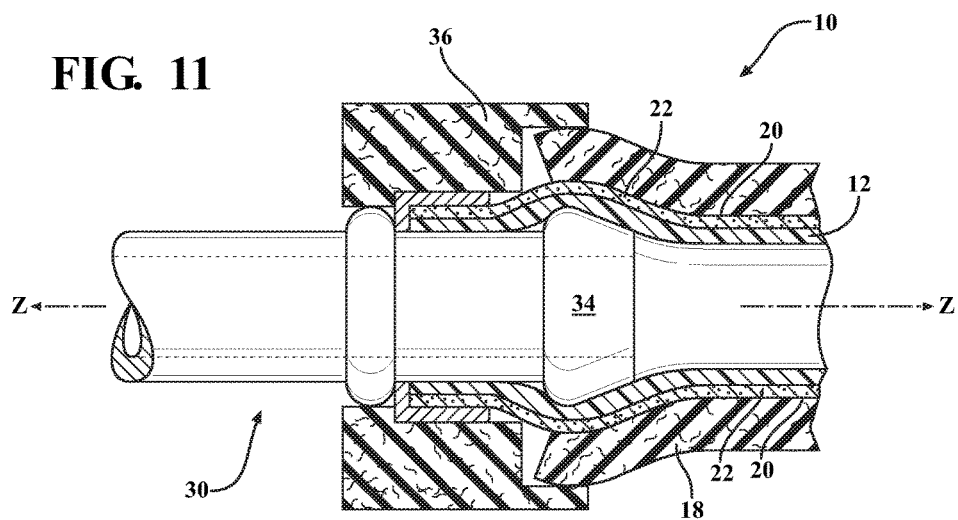
FIG. 11 is a side view of a coupling having a barbed insert which is coupled to a hose assembly via skiving and crimping, said hose assembly comprising a tubular inner layer, a reinforcing layer, a binder layer, and a flame resistant layer and shown in cross-section.

As another example, the hose assembly 10 can be crimped to form a hose joint and partly remove the flame resistant layer 18 (skive the hose assembly 10) in the crimped area. Referring now to FIG. 11, a side view of a coupling 30 having a barbed insert 34 which is coupled to a hose assembly 10 with the hose assembly 10 comprising a tubular inner layer 12, a reinforcing layer 20, a binder layer 22 (wherein the binder layer 22 is disposed throughout the reinforcing layer 20) and a flame resistant layer 18 and shown in cross-section is illustrated. In such an embodiment, the tubular inner layer can comprise polyamide, the reinforcing layer can comprise glass and/or polyamide fiber, and a flame resistant layer 18 comprising TPV and expandable graphite. In FIG. 10, the hose assembly 10 is coupled to a size 8×1 mm metallic tubular inner layer (e.g. steel), which has a barbed insert 34 consisting of a cold-formed end form comprising a barb (nose-beat) on the very front and a stop-beat about 20 mm from the end of the metallic tubular inner layer. In such an embodiment, the hose assembly 10 can be pushed onto the end-form and then crimped onto the coupling 30 (or onto the end of the metallic tubular inner layer) by means of a crimping-ferrule. Notably, the flame resistant layer 18 does not cover the entire length of the coupling 30, but is skived. As such, an additional cover or sleeve 36 comprising TPV and expandable graphite (just as described above with respect to the flame resistant layer 18) is employed. This sleeve 36 imparts flame resistance to the portion of the hose assembly 10 where the TPV was skived. Of course, the sleeve 36 can be made from flame resistant materials with expandable graphite or flame resistant materials without expandable graphite and can be injection-molded or extruded. In contrast, if the hose assembly 10 is skived, there is no protection in that area, so the connector-area might need additional flame protection.

A method of forming the flame resistant hose assembly is also disclosed herein. The method comprises the steps of extruding the tubular inner layer 12 and co-extruding the flame resistant material, at a temperature of less than about 220° C. to form the flame resistant layer 18. Various embodiments of the method include coextruding the various layers described in the different configurations of the flame resistant flame resistant hoses assembly described above. In some embodiments, the step of co-extruding the flame resistant material is further defined a co-extruding the flame resistant material at a temperature of from about 180 to about 250° C.

In some embodiments, e.g. the embodiment of FIG. 1, the tubular inner layer 12 and the flame resistant layer 18 can be coextruded. Such embodiments can provide a compact design having a small outside-diameter and very effective flame resistance.

Embodiments in which the flame resistant material including the expandable graphite is partially expanded during coextrusion, e.g. volumetrically expanded by about 1, 5, 10, 20, 30, 40, 50, 60, 70, 80%, alternatively from about 1 to about 80%, alternatively from about 1 to about 60%, alternatively from about 1 to about 40%, alternatively from about 1 to about 20% are also contemplated herein. In such embodiments, the flame resistant layer 18 can be referred to as partially expanded. In such embodiments the partially expanded graphite functions as a flame resistant armor embedded in the flame resistant layer 18.

As set forth above, the method includes the step of extruding the tubular inner layer 12. The tubular inner layer 12 is just as described above. The tubular inner layer 12 is extruded to the desired dimensions using melt, paste, or any other extrusion technique known in the art. Of course, in various embodiments the tubular inner layer 12 is a multilayer tubular inner layer 12 which can be formed with techniques known in the art, such as co-extrusion techniques. In other embodiments, the tubular inner layer 12 is a monolayer tubular inner layer 12 formed via a paste extrusion.

In various embodiments known in the art, a first dip in the binder or an adhesion promoter can be used to improve the adhesion between the layers of the hose assembly 10. The method disclosed herein can employ such a dip. Alternatively, the method can be free of this first dip step. The method can also include the step of forming the reinforcing layer 20 from the reinforcing fibers. The reinforcing layer 20 can comprise various configurations of the reinforcing fiber and binder.

The method optionally includes the step of heating the hose assembly 10 to melt the binder. If heated, the hose assembly 10 is typically heated to a temperature of greater than about 100, alternatively greater than about 150, alternatively greater than about 200, alternatively greater than about 250, alternatively greater than about 300, ° C.

After the step of heating, the hose assembly 10 is optionally cooled to control physical properties of the tubular inner layer 12 and to maintain the inner diameter and the outer diameter of the tubular inner layer 12.

The method optionally includes the step of pressurizing an interior cavity of the tubular inner layer 12 with a fluid such as water, an inert gas (e.g. nitrogen), or air, through an inlet and an outlet (each end of the reinforced tubular inner layer 12) during the step of heating the reinforced tubular inner layer 12. The cavity of the reinforced tubular inner layer 12 is typically pressurized to a pressure of up to about 500 (3447), alternatively from about 5 to about 100 (34.5 to 689.5), alternatively from about 10 to about 75 (68.9 to 517.1), alternatively from about 20 to about 60 (137.9 to 413.7), PSI (kPa). The step of pressurizing the reinforced tubular inner layer 12 maintains the dimensional integrity of the tubular inner layer 12 during manufacturing and also facilitates adhesion of the layers of the hose assembly 10.

Figure 12:
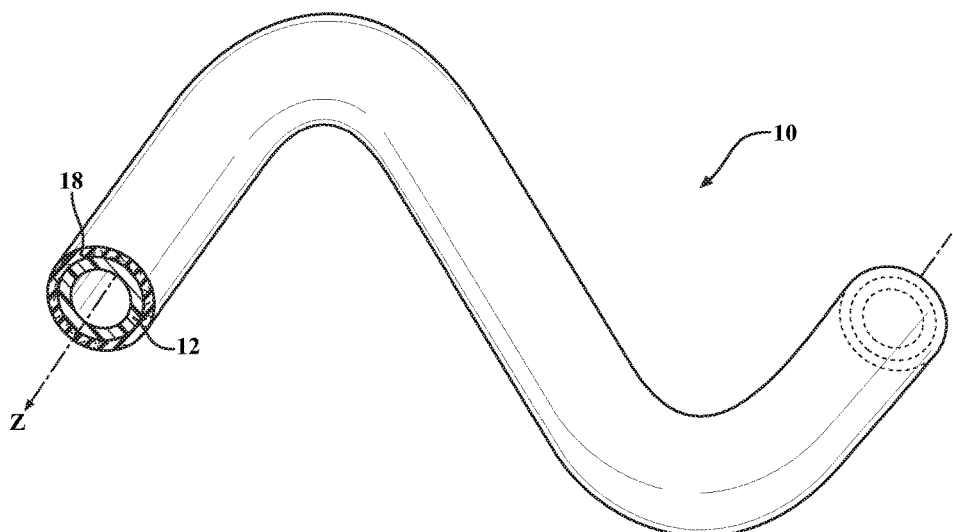
FIG. 12 is a perspective view of a pre-formed hose assembly comprising a tubular inner layer and a flame resistant layer (e.g. the hose assembly of FIGS. 1 and 2).

Once formed, the hose assembly 10 can be pre-formed (thermally or otherwise) into a finished shape. For example, the hose assembly 10 can be heated (locally with a heatsource or in an oven) and shaped as desired and then (in air or water) set in the desired shape. Once pre-formed, there is minimal stress in the hose assembly 10, and the hose assembly 10 is resilient and does not change its formed shape over time. Referring now to FIG. 12, a pre-formed hose assembly 10 is shown. In this non-limiting example, the hose assembly 10 comprises a tubular inner layer 12 and a flame resistant layer 18. Couplings 30 can be attached before or after the pre-forming. When pre-forming by means of heating the entire hose, couplings 30 are typically connected afterwards. If heating is done only in the area to be bent, then couplings 30 can be pre-mounted.

The step of pre-forming the hose assembly 10 can be conducted at a temperature below which the expandable graphite in the flame resistant material of the flame resistant layer 18 expands. Of course, it is also contemplated that the step of pre-forming the hose assembly 10 can be conducted at a temperature to purposely obtain some pre-expansion of the expandable graphite.

In one embodiment, the tubular inner layer 12 is extruded and additional layers are added. The hose assembly 10 is then preformed into a desired shape and then the flame resistant layer 18 is applied to the hose assembly 10.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Many modifications and variations of the present disclosure are possible in light of the above teachings. It is, therefore, to be understood that within the scope of the appended claims, the present disclosure may be practiced otherwise than as specifically described.

What is claimed is:

1. A flame resistant hose assembly for use in motor vehicles comprising:
   a polymeric tubular inner layer having an interior radial surface and an exterior radial surface with said tubular inner layer defining a longitudinal axis,
   a flame resistant layer disposed about and covering said exterior radial surface, said flame resistant layer formed from a flame resistant material comprising:
      a polymeric binder comprising thermoplastic vulcanizate (TPV), said polymeric binder having a softening point of from about 170° C. to about 250° C.; and
      expandable graphite in an amount of from about 5 to about 40 parts by weight based on 100 parts by weight of said flame resistant material, said expandable graphite having an expansion onset temperature of greater than about 210° C.;

wherein said flame resistant layer expands when heated to a temperature of about 220° C. or greater to form a char layer having a post-expansion coverage of said exterior radial surface of said tubular inner layer of greater than about 95%.

2. A flame resistant hose assembly as set forth in claim 1 wherein said flame resistant layer has a volumetric expansion of from about 50 to about 300% when heated to a temperature of about 220° C. or greater.

3. A flame resistant hose assembly as set forth in claim 1 wherein said flame resistant layer maintains a post-expansion coverage of said exterior radial surface of said tubular inner layer of greater than about 99%.

4. A flame resistant hose assembly as set forth in claim 1 wherein said expandable graphite is present in an amount of from about 10 to about 30 parts by weight based on 100 parts by weight of said flame resistant material.

5. A flame resistant hose assembly as set forth in claim 1 wherein said expandable graphite has a mean particle size of from about 200 to about 400 μm.

6. A flame resistant hose assembly as set forth in claim 1 wherein said expandable graphite has a volumetric expansion of from about 50 to about 500% when heated to a temperature of about 600° C.

7. A flame resistant hose assembly as set forth in claim 1 wherein said polymeric binder comprises ethylene propylene diene monomer.

8. A flame resistant hose assembly as set forth in claim 1 wherein said polymeric binder comprises polypropylene.

9. A flame resistant hose assembly as set forth in claim 1 wherein said flame resistant material further comprises an elastomer.

10. A flame resistant hose assembly as set forth in claim 1 further comprising a second flame resistant layer.

11. A flame resistant hose assembly as set forth in claim 1 further comprising a reinforcing layer comprising reinforcing fibers.

12. A flame resistant hose assembly as set forth in claim 1 further comprising an elastomeric layer.

13. A flame resistant hose assembly as set forth in claim 1 further comprising an anti-permeation layer.

14. A flame resistant hose assembly as set forth in claim 1 wherein the softening point of the flame resistant material is from about 180 to about 220° C.

15. A flame resistant hose assembly as set forth in claim 1 wherein said tubular inner layer comprises polyamide.

16. A flame resistant hose assembly as set forth in claim 1 wherein said tubular inner layer comprises a fluoropolymer.

17. A flame resistant hose assembly as set forth in claim 1 wherein said tubular inner layer is electrically conductive.

18. A method of manufacturing a flame resistant hose assembly for use in motor vehicles comprising a polymeric tubular inner layer having an interior radial surface and an exterior radial surface with said tubular inner layer defining a longitudinal axis and a flame resistant layer disposed about said exterior radial surface, said method comprising the steps of:

extruding the tubular inner layer; and co-extruding the flame resistant material at a temperature of from about 180° C. to about 250° C. to cover the exterior radial surface of the tubular inner layer, the flame resistant material comprising a polymeric binder comprising thermoplastic vulcanizate (TPV) having a softening point of from about 170° C. to about 250° C. and expandable graphite having an expansion onset temperature of greater than about 210° C. in an amount of from about 5 to about 40 parts by weight based on 100 parts by weight of said flame resistant material to form the flame resistant layer;

wherein said flame resistant layer of said flame resistant hose assembly expands when heated to a temperature of about 220° C. or greater to form a char layer having a post-expansion coverage of the exterior radial surface of the tubular inner layer of greater than about 95%.

19. A method as set forth in claim 18 wherein said expandable graphite is not expanded during co-extrusion of the flame resistant material.

20. A method as set forth in claim 18 wherein said flame resistant hose assembly is heated and formed to a desired shape.

* * * * *